Oct. 25, 1927.

R. H. PRATT 1,646,458

SAFETY CLUTCH RELEASE

Filed Dec. 4, 1926

Inventor

ROSS H. PRATT.

By Ralph S. Turoff

Attorney

Oct. 25, 1927.
R. H. PRATT
1,646,458
SAFETY CLUTCH RELEASE
Filed Dec. 4, 1926    2 Sheets-Sheet 2
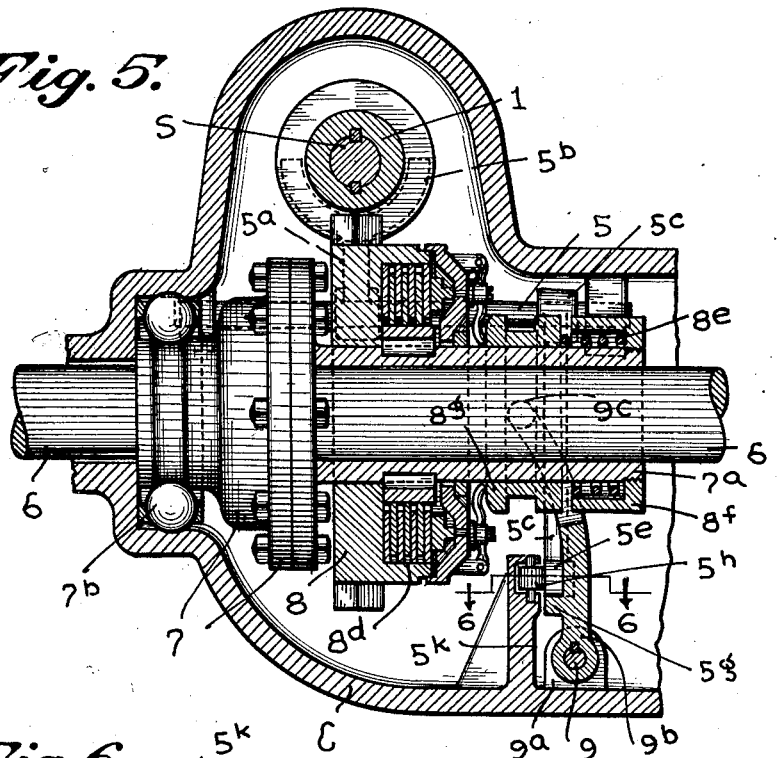
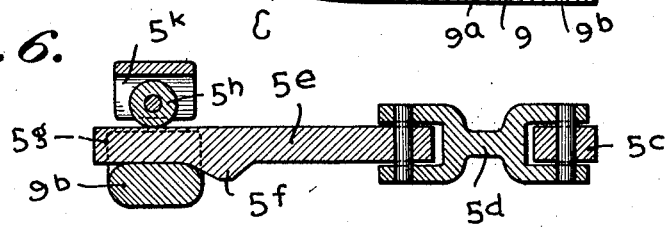
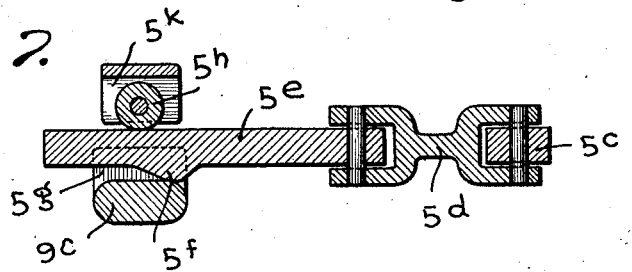
Inventor
ROSS H. PRATT.
By Ralph S. Turoff
Attorney Patented Oct. 25, 1927.

1,646,458

UNITED STATES PATENT OFFICE.

ROSS H. PRATT, OF WASHINGTON, DISTRICT OF COLUMBIA.

SAFETY CLUTCH RELEASE.

Application filed December 4, 1926. Serial No. 152,650.

This invention relates to safety clutch release mechanism and more particularly to safety clutch releases especially designed for use in connection with worm-driven power transmissions.

It is a major purpose of the present invention to provide a novel clutch release, particularly designed for the aforesaid worm-driven transmissions, adapted to automatically operate upon any undue stress being had between the driven worm-gear and the driving worm.

In worm-driven power transmission, where a drive shaft or driving member is provided with a worm adapted to mesh or engage with a worm-gear carried by the driven member, if for any reason the motive power suddenly ceases, the momentum of the driven member results in a further rotation of the worm-gear thereon with the resultant excessive end-thrust of the teeth on such gear against the teeth of the drive worm; this resulting, unless the driven member is brought to an immediate stop in the damaging or "stripping" of the teeth on either the worm or the worm gear.

In an effort to safeguard against this, in the great majority of transmissions of this type, driving worms are employed having an exceedingly steep pitch, and upon the removal of the motive power, the teeth of the worm-gear contact with the relatively steep, inclined sides of the teeth on the drive-worm thus permitting of "coasting" without any motive power. Obviously with the use of a driving-worm of lower pitch, the teeth thereon would lie in a plane more perpendicular with respect to the teeth on the worm-gear. This is most particularly true of the present types of worm-driven transmissions or drives used in connection with motor vehicles, where the driving-worm is provided with a pitch generally in excess of 45°; the greatest objection to such steeply pitched worms being their excessive side-thrust and consequent strain upon worm-gears, bearings, and casings, while with a lower pitched worm power may be imparted to the driven member with a great deal more facility.

It is accordingly a major purpose of the present invention to provide a safety clutch release which will permit of the use of worms of any desired pitch in power transmissions of the class described, and which will obviate any possibility of damage being had to the worms or worm-gears through end-thrust as above described or through any other cause.

The invention has been illustrated and described in the drawings as particularly adapted to the novel transmission of the worm-driven type described and claimed in a co-pending application filed by the inventor under date of October 2nd, 1926, and bearing Serial Number 139,170; it being understood that such illustration is merely illustrative of one embodiment of the invention and is not in any way limitative inasmuch as application thereof might be as conveniently had with any other type of worm-driven power transmission.

In particular the invention provides a novel mounting of the drive-worm upon the drive shaft, novel mechanism and connections between said worm and the clutch of the transmission, and novel means for actuating such mechanism to automatically release said clutch should conditions require same. Further objects of the invention will be hereinafter more fully set forth.

The accompanying drawings illustrate one practical transmission, of the worm-driven type, embodying the present invention, which will be described in detail to enable others to understand and use the same, but the invention is not considered restricted to the specific construction shown in the drawings, and reference is therefore had to the claims for summaries of the essentials of the invention and of the novel features of construction and novel combinations of parts for all of which protection is desired.

As shown in the drawings:—

Figure 5 is a transverse sectional view through the entire transmission taken on the line 5—5 of Figure 1.

Figure 6 is a magnified detail sectional view taken on the line 6—6 of Figure 5 illustrating one form of actuating lever in disengaged position.

Figure 7 is a view similar to Figure 6 illustrating the actuating lever in engaged position.

Figure 1:
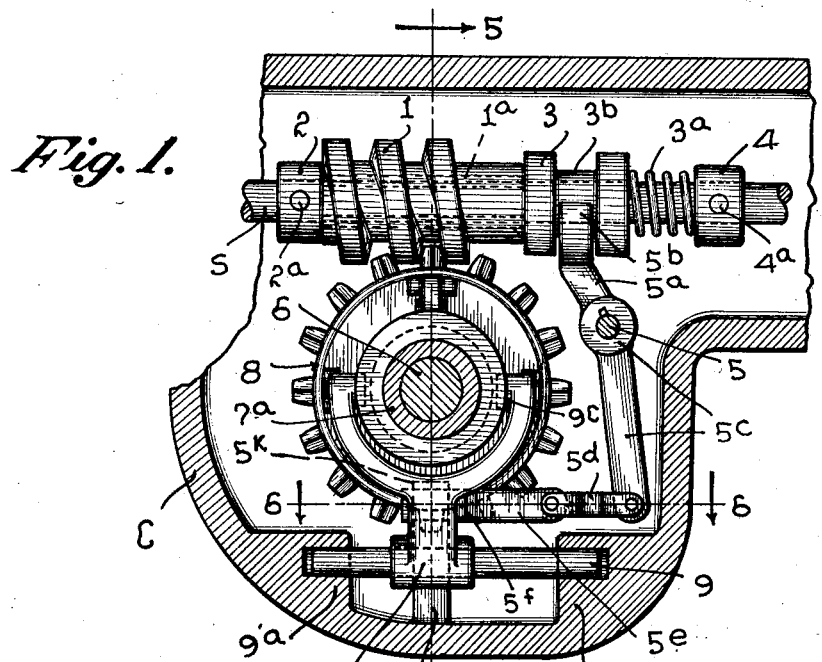
Figure 1 is a sectional view through an entire worm-driven transmission, parts being broken away, illustrating the same in operative or engaged position.
Figure 2:
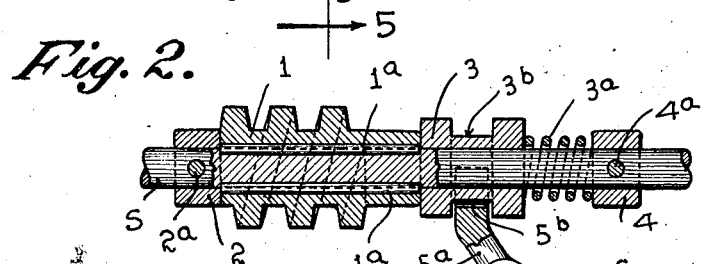
Figure 2 is a longitudinal sectional view through the drive shaft illustrating the novel mounting of the drive-worm thereon, illustrating the same in operative or engaged position.

As shown in the drawings there is provided a driving member or drive shaft S carrying a driving-worm 1, splined or otherwise slidably secured thereto as at 1ª, and adapted to engage or mesh with a worm-gear 8 carried by the driven member. In the particular embodiment of the present invention illustrated, the aforesaid driven member is designed to comprise the "rear-end" of a motor vehicle, and includes a pair of axially aligned axles or shafts 6 having their inner extremities terminating in the usual differential (not shown) mounted within the usual differential housing 7.

A suitable housing or casing C is provided for the "rear-end," such housing preferably forming an integral part of a casing surrounding the drive shaft and the drive-worm and associated mechanism thereon. Suitable bearings 7ᵇ, of any desired type and only one of which has been illustrated, are provided for the proper support and alignment of the shafts or axles 6. The differential housing 7 is provided at one side thereof with an integral sleeve extension 7ª, surrounding the axle 6, and upon which is mounted for free rotation the driving worm-gear 8.

The gear 8 preferably has associated therewith a suitable clutch of any desired type properly mounted upon the sleeve 7ª. There has been illustrated in the drawings the usual type of "disc" clutch, comprising the usual outer drum preferably forming an integral part of the worm-gear 8, inner drum keyed or otherwise secured to the sleeve extension 7ª, the discs, clutch push ring, driving plate and clutch fingers, all as are well known in the art and need no further description here. Obviously any other suitable type of clutch might be as conveniently used. The clutch 8ᵈ is adapted to be held in engaged position by the pressure of a coil spring 8ᵉ interposed between a recessed lock-nut 8ᶠ secured upon the sleeve 7ª adjacent the extremity thereof and a clutch shift ring 8ᵍ freely mounted upon the said sleeve. The clutch shift ring is provided with a centrally located turned-down portion adapted for engagement with the inturned extremities 9ᶜ of a clutch-fork 9ᵇ secured to a counter-shaft 9 journalled within suitable bearings 9ª on the inner face of the transmission housing. It will be readily understood that movement of the clutch fork in a clock-wise direction with relation to the mounting thereof on the counter-shaft 9 will result in the lateral movement of the clutch shift ring with the resultant compression of the coil spring 8ᵉ and the release or disengagement of the clutch 8ᵈ, thereby freeing the worm-gear 8 and permitting the same to come to rest or rotate independently of the driven shafts 6 and associated parts of the driven member.

The drive-worm 1 is retained in proper position upon the drive shaft between collars 2 and 3 mounted adjacent thereto upon said shaft. The collar 2 is rigidly secured against endwise movement upon the shaft as by a pin 2ª or other suitable means, while the collar 3 is loosely mounted upon such shaft, and is retained against the adjacent end of the drive-worm by a coil spring 3ª mounted upon the drive shaft between the collar 3 and a collar 4 also rigidly secured upon said shaft against endwise movement as by a pin 4ª or other suitable means. The tension of the coil spring against the drive-worm through the collar 3, is sufficient under normal conditions of operation to retain the drive-worm against the collar 2, in proper position for driving engagement with the worm-gear 8.

Figure 3:
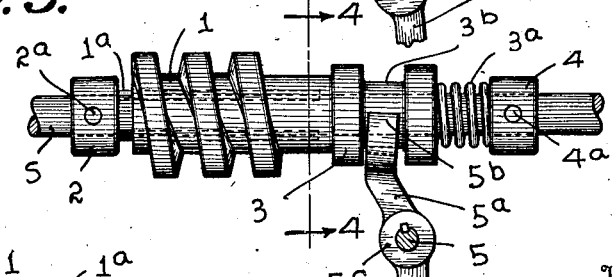
Figure 3 is a view similar to Figure 2 illustrating in elevation, the drive-worm and associated mechanism in disengaged position.
Figure 4:
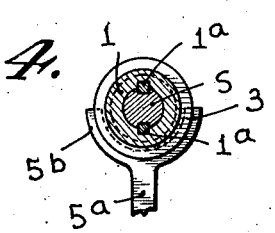
Figure 4 is a fragmentary detail sectional view taken on the line 4—4 of Figure 3.

Rotation of the drive shaft S will result, through the worm 1 and worm-gear 8, in the rotation of the driven member. Should the motive power suddenly cease, for any reason, the drive shaft and worm thereon would immediately come to rest while the momentum of the driven member would tend to continue the rotation of the worm-gear thereon. As a result of such continued rotation the teeth on the worm-gear would be forced against the relatively perpendicularly disposed faces of the teeth on the drive-worm and the pressure thus exerted would result in the lateral movement of the said drive-worm to the position illustrated in Figure 3 of the drawings for a purpose to be hereinafter more fully described.

The movable collar 3 is provided with a centrally located turned down portion 3ᵇ adapted for engagement with the fork 5ᵇ of a shifting member or lever 5ª fixedly secured to a shaft 5 pivotally mounted within suitable bearings within the transmission housing. A downwardly depending lever 5ᶜ is also fixedly secured to the shaft 5, preferably in approximate alignment with the clutch fork 9ᵇ above referred to, and has at its lower extremity connection with an actuating lever 5ᵉ through a link 5ᵈ.

The actuating lever 5ᵉ is adapted to contact with the inner face of the clutch fork 9ᵇ and is provided with a wedge-shaped cam-like portion 5ᶠ for a purpose to be hereinafter more fully described. The lever 5ᵉ is maintained in proper position abutting the clutch fork by any suitable means, as by resting upon an extension or shoulder 5ᵍ formed on the inner face of the clutch fork and by being retained against side-wise movement by a roller 5ʰ journalled within a standard 5ᵏ formed integrally with or secured to the casing C (see Figure 5 of the drawings).

In the normal position of the actuating lever, the cam-like portion 5ᶠ thereof will be free and immediately adjacent the clutch fork. However the exertion of any undue stress or pressure by the worm-gear 8 against the teeth of the drive-worm, will, as above described, result in a forward movement of the drive-worm and collar 3 against the pressure of the coil spring 3ᵃ to the position illustrated in Figure 3 of the drawings. Such forward movement will result, through the levers 5ᵃ and 5ᶜ, in a rearward movement of the actuating lever 5ᵉ and through the wedge-shaped cam thereon the clutch fork 9ᵇ will be moved sufficiently to disengage the clutch 8ᵈ. Immediately upon the release of such clutch the worm gear 8 will be freed from any rotative force or momentum and will be immediately brought to a position at rest, thus eliminating any possibility of damage to either the drive-worm or driven worm-gear. The tension of the spring 3ᵃ should be sufficient so as not to permit of the release of the clutch as above described and thereby permit a vehicle descending a grade to travel more rapidly than the governing speed set for it by the driving worm rotating in either "first" or "second" speeds.

It has been found in actual practice that the aforesaid mechanism may be so adjusted as to release the clutch only sufficiently to prevent breakage, retaining as much friction in the clutch as possible to act as a braking element to check the momentum and slow down the movement of a vehicle equipped with worm-driven transmission constructed in accordance with the present invention.

While in the embodiment of the invention illustrated, the clutch has been shown and described in conjunction with and forming a part of the driven worm-gear, it will be clearly understood that such disclosure is only illustrative, the invention being just as applicable upon merely a variation of connecting link and actuating lever, to operate directly upon the usual engine clutch to be found in automobile transmission construction, or the usual clutch to be found in any type of worm-driven power transmission.

Obviously any type of operative mechanism or connection might be had between the drive-worm and the clutch whereby upon utilization of the essential feature of the present invention, i. e. the resilient mounting of the drive-worm so that undue stress thereon will result in a lateral movement thereof, such movement would result through the aforesaid mechanism in the immediate disengagement of the said clutch.

There has thus been described a clutch release especially designed for use in connection with "worm-driven" types of power transmissions, adapted to automatically operate upon any undue stress or strain being had between the driving-worm and the driven worm-gear.

I claim:

1. A power transmission of the class described including driving and driven members, operative connection therebetween comprising a worm-gear carried by the driven member adapted for engagement with a drive worm carried by the driving member and longitudinally movable thereon, a clutch connection between said worm-gear and the driven member, and operative connections between the drive-worm and said clutch to disengage the clutch upon a longitudinal movement of the worm.

2. A power transmission of the class described including driving and driven members, operative connections therebetween comprising a worm-gear carried by the driven member adapted for engagement with a drive worm carried by the driving member and longitudinally movable thereon upon predetermined stress between the worm-gear and the said drive worm, a clutch connection between said worm-gear and the driven member, and operative connections between the drive worm and the said clutch to disengage the clutch upon longitudinal movement of the worm.

3. A power transmission of the class described including driving and driven members, operative connections therebetween comprising a worm-gear carried by the driven member adapted for engagement with a drive worm carried by the driving member and longitudinally movable thereon upon predetermined stress between the worm-gear and the said drive worm, a clutch connection between the worm-gear and the driven member, operative connections between the drive worm and the said clutch operable to disengage the clutch upon longitudinal movement of the worm, and means for returning the drive worm to its normal position and simultaneously re-engaging the clutch.

4. In a power transmission of the class described, in combination, driving and driven members, operative connection therebetween comprising a worm-gear carried by the driven member and adapted for engagement with a drive worm carried by the driving member and longitudinally movable thereon upon predetermined stress between the said worm-gear and drive worm, a clutch connection between said worm-gear and the driven member and a clutch fork adapted to actuate said clutch, operative connections between the drive worm and the clutch operable to disengage the clutch upon longitudinal movement of the drive worm comprising a reciprocable lever having a wedge-shaped cam-like portion adapted to engage with the aforementioned clutch fork, and resilient means for returning the drive worm to its normal position and simultaneously re-engaging the clutch.

5. In a power transmission of the class described, in combination, a driving member driving a driven member at a predetermined ratio of speed, a clutch, operative connection between the driving member and the clutch for controlling the said clutch, and means responsive to the relative speeds of rotation of the driving and driven members for automatically releasing the clutch upon the speed of rotation of the driving member falling below the aforesaid predetermined ratio.

6. In a power transmission of the class described, in combination, a driving member driving a driven member at a predetermined ratio of speed, operative connections therebetween comprising a drive worm carried by the driving member adapted for engagement with a worm-gear carried by the driven member, a clutch connection between said worm-gear and the driven member, operative connection between the driving member and the clutch for controlling the said clutch, and means responsive to the relative speeds of rotation of the driving and driven members for automatically releasing the clutch upon the speed of rotation of the driving member falling below the aforesaid predetermined ratio.

7. In a power transmission of the class described, in combination, driving and driven members, operative connections therebetween comprising a worm-gear carried by the driven member adapted for engagement with a drive worm carried by the driving member and longitudinally movable thereon, a clutch connection between the worm-gear and the driven member, operative connections between the drive worm and the clutch for controlling said clutch, means responsive to the relative speeds of rotation of the driving and driven members for automatically releasing the clutch upon the speed of rotation of the driving member falling below its proper ratio to that of the driven member, and means for re-engaging the clutch upon the proper relative speed ratio being resumed.

In testimony whereof he affixes his signature.

ROSS H. PRATT.